United States Patent [19]
D'Angelo

[11] Patent Number: 5,756,889
[45] Date of Patent: May 26, 1998

[54] AUTOMATIC TIRE RESTRAINTS FOR CHASSIS DYNAMOMETERS

[75] Inventor: Severino D'Angelo, Laguna Beach, Calif.

[73] Assignee: Snap-on Technologies, Inc., Lincolnshire, Ill.

[21] Appl. No.: 619,439

[22] Filed: Mar. 21, 1996

[51] Int. Cl.⁶ .................................................. G01M 15/00
[52] U.S. Cl. .................................. 73/117; 73/123; 73/124
[58] Field of Search .............................. 73/117, 123, 124, 73/125, 126, 130

[56] References Cited

U.S. PATENT DOCUMENTS

| | | | |
|---|---|---|---|
| 2,022,340 | 11/1935 | Deane | 73/125 |
| 2,036,653 | 4/1936 | Starr | 73/124 |
| 2,601,187 | 6/1952 | Volis | 73/117 |
| 4,144,951 | 3/1979 | Rea | 188/32 |
| 4,455,866 | 6/1984 | Barrigar | 73/117 |
| 4,912,970 | 4/1990 | Gicewicz | 73/117 |
| 5,000,038 | 3/1991 | Katt | 73/117 |
| 5,231,870 | 8/1993 | Fukuda et al. | 73/117 |
| 5,402,674 | 4/1995 | Ganzhorn, Jr. et al. | 73/117 |
| 5,445,013 | 8/1995 | Clayton, Jr. et al. | 73/117 |

*Primary Examiner*—Richard Chilcot
*Assistant Examiner*—Eric S. McCall
*Attorney, Agent, or Firm*—Emrich & Dithmar

[57] ABSTRACT

A device for restraining the driving tires of a vehicle on a chassis dynamometer which includes sidewall rollers that position themselves automatically as the vehicle approaches the dynamometer and which lock in place before the dynamometer test begins. The restraining rollers are rotatably mounted on one or more carriers that are initially free to move right or left to accommodate the position of the vehicle's tires. When the latter are satisfactorily aligned with respect to the dynamometer rollers, the movable carriers are locked in place, restricting the lateral movement of the driving tires during the test on the dynamometer. The invention is intended particularly for dynamometers in exhaust emission testing facilities, including garages and service stations, where a low-cost, yet robust, vehicle restraint system is desired.

13 Claims, 3 Drawing Sheets

AUTOMATIC TIRE RESTRAINTS FOR CHASSIS DYNAMOMETERS

BACKGROUND OF THE INVENTION

1. Technical Field

This invention relates to devices that restrict the non-rotational motion of a vehicle's driving tires while the vehicle is being driven on a chassis dynamometer, and more particularly to a device that positions itself to achieve said restraining action automatically as the vehicle is being driven onto the dynamometer.

2. Discussion

A chassis dynamometer is a device that simulates the road load and/or inertia forces of a vehicle by applying the road-equivalent force tangentially to the circumference of the vehicle's driving tires while said vehicle is driving on the dynamometer. If the vehicle's driving tires are not perfectly perpendicular to the roller axis while the vehicle is driving on the rollers, there is a tendency for the vehicle to move to one side or the other as the vehicle drives on the rollers. To avoid said lateral motion of the vehicle, a restraining means must be available. Likewise, because of Newton's Third Law, any force applied tangentially by the driving tires of the vehicle to the surface of the dynamometer's rollers is accompanied by an equal reactive force in the opposite direction. On a chassis dynamometer, said reactive force tends to push the vehicle either forward or backward off the rollers. Again, to avoid such forward/backward vehicle motion during the application of tractive force, a restraining means must be available.

The need for restraining the vehicle during a driving test arises for two fundamental reasons: (a) safety, and (b) accurate road simulation. If the vehicle is thrown off the rollers it may injure personnel, including the driver, and it may damage nearby equipment, as well as the vehicle itself. If the vehicle is insufficiently restrained, particularly during accelerations and decelerations, and its driving tires are permitted to move forward or backward up and down the curvature of the rollers, the dynamometer will be unable to consistently apply the correct loading to the vehicle's driving tires, and errors in road simulation will result.

As a result of the U.S. Clean Air Act of 1990, chassis dynamometers are increasingly becoming a required component of routine vehicle exhaust inspection programs. These programs are widely known as "I/M" (Inspection/Maintenance). The dynamometers are either concentrated in large "centralized" testing facilities where many vehicles are tested as rapidly as possible, or they are distributed among a number of "decentralized" locations, typically garages and service stations. In both environments, for the reasons given above, it is important that the vehicles be adequately restrained during the dynamometer tests. It is preferred that the method of restraint be rapid and inexpensive, as well as effective.

Prior art restraint systems for motor vehicles on chassis dynamometers fall into five categories: (1) vehicle body tie-down devices, (2) vehicle body clamping devices, (3) chocking devices for the non-driving wheels, (4) devices that control the angular position of the steering wheel of front-wheel drive vehicles, and (5) rollers that restrict the movement of the driving tires beyond a prescribed zone. The present invention falls into category (5). The disadvantages of prior art restraint systems can be summarized as follows:

Vehicle body tie-down devices (Category 1) are straps, ropes, or chains that are connected between the frame or body of the vehicle and fixed points in the test area. This manual approach is effective and inexpensive, and is widely employed in exhaust emission testing laboratories for certifying new vehicles. Such laboratories are operated under stringent safety rules by highly trained technicians. In the I/M environment of the centralized testing facility and decentralized garage or service station, a rapid throughput of vehicles is desired for economic reasons, and technicians are typically not as well trained, and may not have as much time, as do technicians in certification laboratories. In such environments, safety standards are more difficult to maintain, and tie-down restraints have obvious drawbacks: they are time-consuming, the attachment points on the vehicle are not uniformly placed and may be inaccessible or unavailable, and to save time, the operator may elect not to use tie-downs and would thereby generate a breach of safety.

Vehicle body clamping devices (Category 2) are generally large and difficult to adapt to the existing range of vehicle sizes. Such a device is illustrated in U.S. Pat. No. 4,455,866. Furthermore, many modern vehicles have bumpers that are designed to deform when moderate force is applied to them. Such bumpers are easily damaged by body clamping devices, and this approach to vehicle restraint is of minimal value in an environment in which many different vehicle body types are tested and in which the owners of the vehicles are highly sensitive to damage that may be inflicted on their vehicles.

Chocks for the non-driving wheels (Category 3) are essentially wedges that are jammed in front of and behind the non-driving tires. Such a device is illustrated in U.S. Pat. No. 4,144,951. These are inexpensive and useful devices for restricting the forward and backward motion of the vehicle during the emission test. They are incapable of restricting lateral motion of the vehicle, however. They can be defeated by simply failing to use them.

Devices that control the, angular position of the steering wheel of front-wheel drive vehicles (Category 4) include passive systems in which a rigid arm is connected to the top of the steering wheel, passes out the side window of the vehicle, and is attached to a fixed point in the test area. If, for example, the vehicle pulls to the right, the rigid arm will cause the steering wheel to turn to the left, which will in turn cause the vehicle to straighten. More complicated systems that actively control steering wheel position are also available. The disadvantage of passive steering control systems in the I/M environment is that they tend to be overly sensitive to accidental external lateral forces applied to the vehicle, and are unsafe. The disadvantage of the active systems is that they require sensing and controlling means and are consequently expensive.

The final category of restraints (Category 5) are rollers that restrict the movement of the driving tires beyond a prescribed zone. If the tire moves beyond this zone, it makes contact with one or more rollers and its further movement is thereby restricted. To minimize unwanted drag on the tires during the emission test, and to minimize scuffing of the tire sidewall, the axis of rotation of the restraining rollers is ideally positioned such that if extended along an imaginary line, it would intersect the axis of rotation of the tire itself. The rollers in this category of restraint system are located such that they make contact with the sides of the tire and/or the front or rear of the tire whenever the tire moves out of the prescribed zone. A roller restraint system is disclosed by U.S. Pat. No. 5,402,674. In this device, the positioning of the rollers relative to the tire is automatically assured by a motor. The motor is controlled with the aid of various sensors and switches. In general, roller restraints are highly effective, and are widely used.

However, there are notable disadvantages to prior art roller restraints, all of which are remedied by the present invention. Prior art roller restraints are either (a) not adjustable, or (b) if they are adjustable, the adjustment must be performed manually, or (c) if the adjustment is automatic, they require an additional external motor drive and control means, which adds significantly to complexity and cost.

Those systems in which the rollers are not adjustable by the operator do not easily accommodate various tire widths and various vehicle track widths. This gives rise to disadvantage (a) mentioned above. The rollers are positioned for the widest tire and widest wheelbase that is expected to be encountered, with the consequence that more typical tires are given a surplus of free play. To keep the vehicle from moving excessively within this space, it is typically necessary to use a second restraining means to restrict lateral motion. U.S. Pat. No. 5,445,013 (FIG. 2, Item 48) eliminates this problem by providing a means to manually position the small restraining rollers after the vehicle has been aligned on the dynamometer. This adjustment method is not automatic and therefore suffers from disadvantage (b) mentioned above.

Prior art systems in which the adjustment of the lateral restraint rollers is automatic require a drive motor and control means to achieve the automatic positioning, i.e., disadvantage (c). An example of such a device is the above-mentioned U.S. Pat. No. 5,402,674. Automated, motorized systems are effective and quite satisfactory for centralized I/M applications, but are not ideal for decentralized testing at the garage level, where vehicle throughput is relatively low and the financial success of the operation is more sensitive to the original investment in equipment. Furthermore, motorized systems tend to have more sophisticated requirements regarding operation and maintenance which pose relatively little problem for centralized operations with dedicated maintenance personnel, but are problematic for the small garage where such personnel are not as readily available.

In summary, all of the previous vehicle restraint designs for chassis dynamometer suffer from one or more problems in the I/M garage environment. The ideal vehicle restraint system for chassis dynamometers in both the centralized and decentralized test environments has the following characteristics. The present invention satisfies these ideals:

1. Effective
2. Low cost
3. Automatic
4. Not easily defeated
5. Safe

SUMMARY OF THE INVENTION

The present invention solves the problems of prior art restraint systems referred to above, and at the same time, offers all the characteristics just listed for an ideal vehicle restraint system for the I/M emissions testing environment.

The invention has a restraining roller adjacent to the inside face of one of the driving tires and another restraining roller adjacent to the outside face of the same tire. The inner and outer restraining rollers are attached to a laterally movable carrier, the movement of which allows the positioning of the restraint rollers relative to the vehicle. These features are illustrated in FIG. 1. In addition to the restraint rollers, the carrier supports a pair of guides that project approximately horizontally over the dynamometer rollers. The automatic positioning of the device is achieved by the driving tire of the vehicle forcing its way between the guides, and in turn causing the guides to correctly position the sliding carrier, and the rollers attached to it, relative to the driving tire. Said sliding carrier is supported by bearings and moves easily right and left. The positioning of the restraint rollers is automatic in the sense that the system requires no operator intervention and no extra time for setup, i.e., the restraint rollers are positioned automatically as the vehicle's driving tires mount the dynamometer rollers, and can be locked automatically in their final positions. Unlike prior art automatic restraint systems, the present invention requires no motorized carriers and no sensors. As soon as the vehicle is on the dynamometer rollers, the driver slowly rotates the driving tires on the rollers to align the vehicle perpendicularly to the dynamometer rollers. After the vehicle is aligned, but before the formal driving test begins, the sliding carriers are locked in place, effectively restraining the vehicle from further lateral motion. The locking may be performed remotely by an action of the operator, or may be triggered when the computer senses that the dynamometer rollers have exceeded a given slow speed. Unlike some motorized carrier restraints which can simply be turned off, the only way to defeat the present invention is to physically remove it. The invention is low-cost because it is built of readily available, inexpensive parts and because, in its simplest embodiment, it does not require motors, sensors, and drive mechanisms.

The preferred embodiment of the invention includes inner and outer restraint rollers employed on a single driving tire. To restrict forward and backward motion of the vehicle during any tests requiring hard accelerations or decelerations, the non-driving wheels of the vehicle should not only be held with the hand brake, but should also be chocked. The restriction of forward motion can be achieved with a minor modification to the preferred embodiment, i.e., by mounting a third roller immediately in front of the driving tire. Additional lateral restraining effect may be achieved by applying the present invention to both right and left driving tires of the vehicle.

DESCRIPTION OF THE PREFERRED EMBODIMENT

Figure 1:
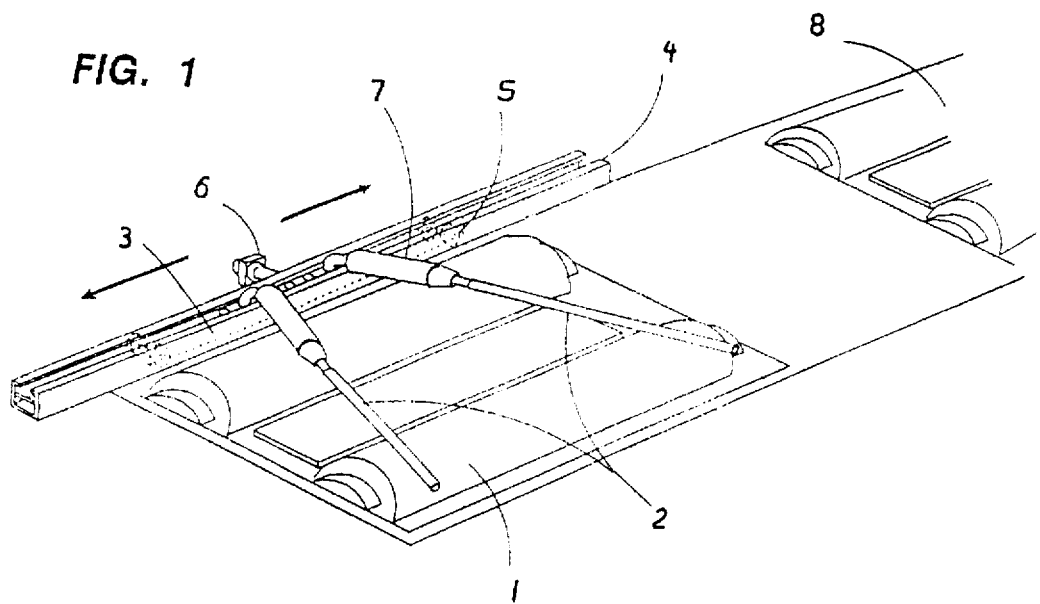
FIG. 1 depicts the automatic restraint system disclosed here mounted over the left roller pair of a chassis dynamometer.

Referring to FIG. 1, the vehicle tire to be restrained enters the drawing from the lower right. As the tire approaches the dynamometer roller 1, it forces itself between the two guide rods 2. The rods are attached at their bases to the sliding carrier 3, which is free to move right or left as a result of force applied by the advancing tire. The free movement of the carrier within its track 4 is facilitated by wheels 5 near each end of the carrier. Once the vehicle has been aligned perpendicularly to the roller axes the carrier locking mechanism 6 is released, preventing further movement of the carrier. Each guide rod has a small roller 7 near its base. If the vehicle moves laterally during the driving test, the tire will make contact with one of these small rollers and the latter will restrain the tire. Also included in FIG. 1 is the right roller assembly 8. The restraints of the present invention are required on one side of the dynamometer only, although another embodiment provides a similar restraining device on the other side of the dynamometer. In left-hand-drive vehicles it is easier for the driver can see the position of the restraints when the latter are mounted on the left roller assembly, as opposed to the right.

Figure 2:
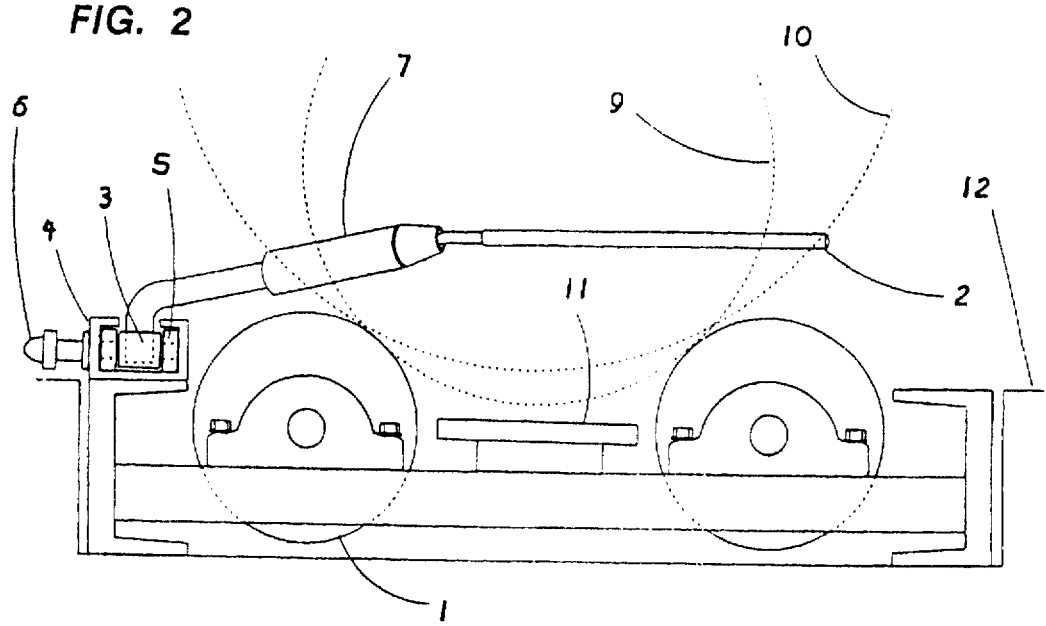
FIG. 2 depicts the same restraint system viewed from an axial direction with-respect to the dynamometer rollers.
Figure 3:
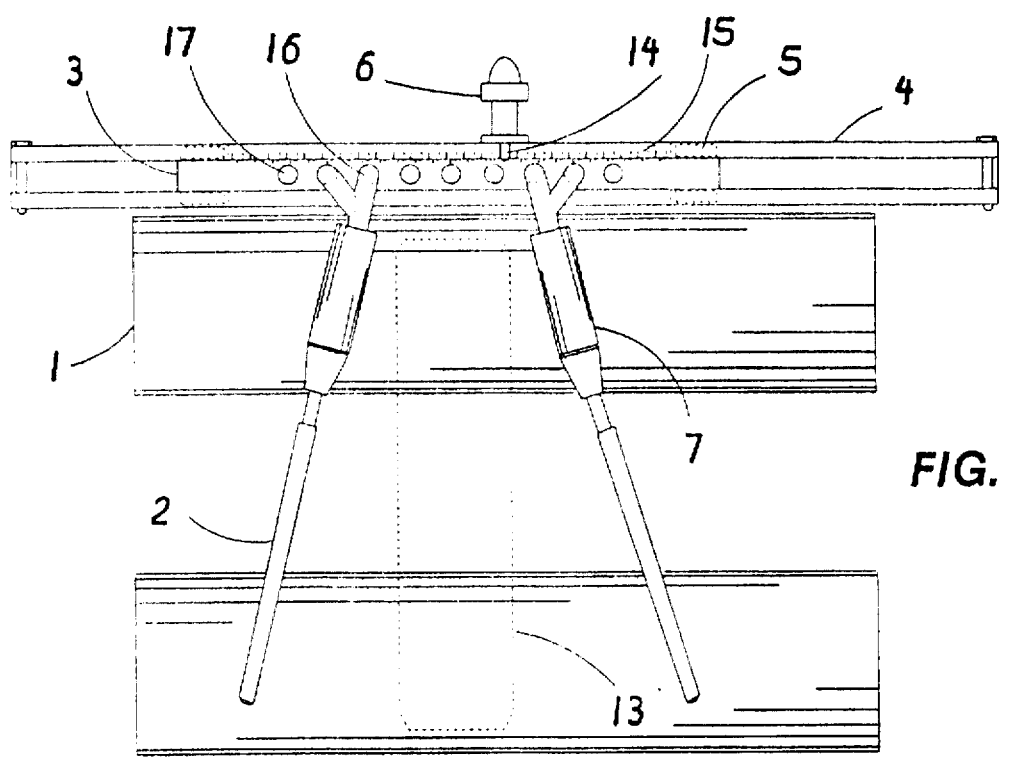
FIG. 3 depicts the same restraint system of FIGS. 1 and 2 viewed from above.
Figure 4A:
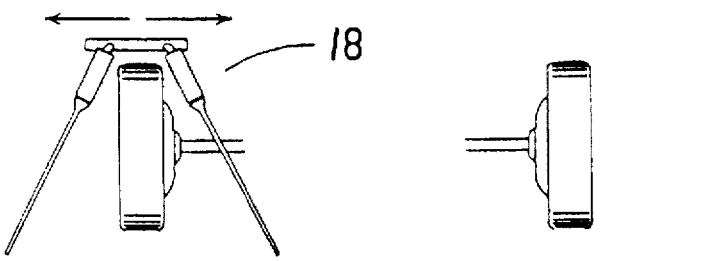
FIG. 4A–4E illustrate five embodiments of the invention, showing the relationship between the driving tires of the vehicle and the laterally movable restraint rollers of the invention.
Figure 4B:
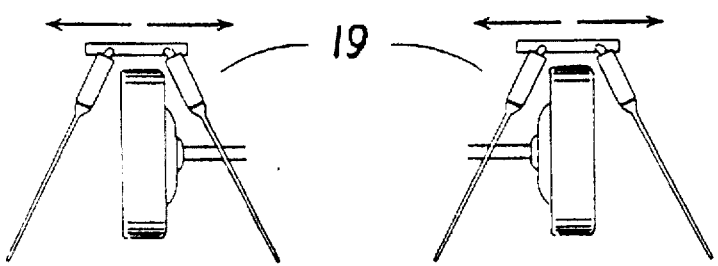
Figure 4C:
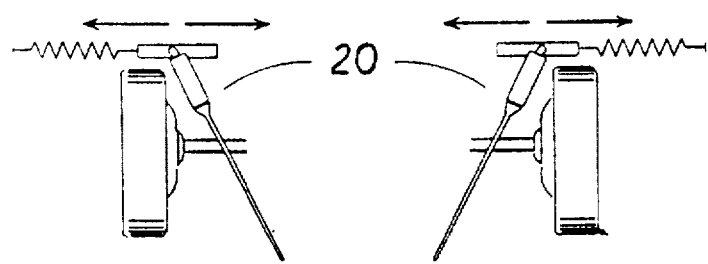
Figure 4D:
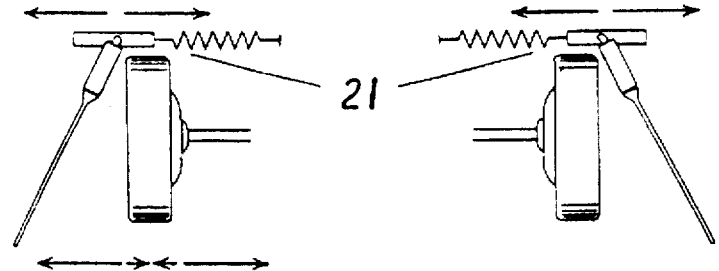
Figure 4E:
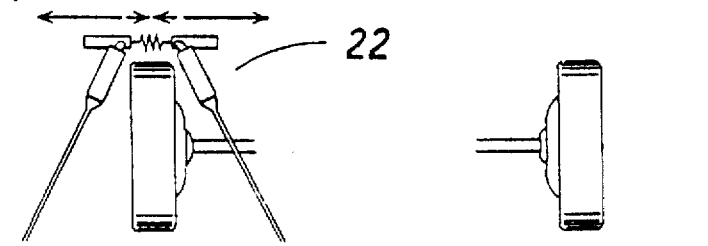

Referring to FIG. 2, the invention is illustrated from the side, showing the approximate position of the smallest 9 and largest 10 vehicle tire that is likely to be used. Below the tire is the lift 11, which, when raised, facilitates the removal of the vehicle from the dynamometer. FIG. 2 clearly shows how the carrier 3 is supported by wheels 5 which are guided by track 4. The locking mechanism 6 keeps the carrier from moving once it has been satisfactorily positioned. Also, the roller 7 which freely rotates on its guide rod 2 is evident. The dynamometer shown in FIG. 2 has been installed in a shallow pit. The floor 12 of the test room is indicated Referring to FIG. 3, the position of a driving tire 13 is shown between the two guiding rods 2. If the tire travels to the right or left as the vehicle is driven, it will come in contact with the small rollers 7. To keep the carrier 3 from moving during the test, it is held by the pin 14 that extends from the locking device 6. The pin will engage any of the many holes 15 along the back of the carrier, depending on the location of the carrier when the locking device is released. To allow for unusually narrow or wide tires, the guide rods can be manually repositioned by lifting them at their bases 16 and extracting them from the carrier. A row of holes 17 are provided for this purpose. The same holes may be used for the insertion of a front restraining roller to keep the tire from moving off the dynamometer in a forward direction. Such a roller would be removed when a rear-wheel-drive vehicle is to be installed on the dynamometer or when the vehicle must be driven forward over the dynamometer Referring finally to FIG. 4A–4D, four basic configurations for the automatic tire restraint are illustrated. The configuration of the preferred embodiment 18 consists of an inner and outer restraint roller for one of the two vehicle driving tires. An alternative configuration 19 consists of inner and outer rollers for both right and left driving tires. Yet another configuration 20 is comprised of inner rollers only. In this configuration, the moving carriers are lightly spring-loaded such that when no force is applied to them by the tire, they positioned themselves toward the outside of their range of movement. The advancing tires apply lateral pressures which force the right and left carriers toward each other where they are ultimately locked in position using one of the means described earlier. Yet another configuration 21 illustrated in FIG. 4D is similar to the previous one, except that here the restraining rollers are initially positioned close to one another. The advancing tires apply lateral pressures which force the right and left carriers away from each other, where they are again locked in position using one of the means described earlier. The final configuration 22 shown in FIG. 4E again has the right and left restraint rollers each rotatably mounted on their own carriers, the latter being lightly spring-loaded such that the tire can easily force itself between them. This configuration is particularly suited for front-wheel-drive vehicles, where the driver has control over tire angle via the steering wheel. Thus, the driver can drive forward, pushing the tire between the spring-loaded restraint rollers, align the vehicle by slowing motoring on the dynamometer rollers, brake the vehicle to a stop, turn the steering wheel to the right to force the right restraining roller slightly to the right, lock the corresponding carrier in place, then turn the steering wheel to the left to force the left restraining roller slightly to the left, and then lock the left carrier in place. The locking can be done remotely by the driver. This procedure allows the configuration 22 to be used with tires of a much wider range of widths without requiring manual adjustment of restraint roller position.

Although the above-described embodiments rely totally on the advancing tire to position the restraint rollers, it is not difficult to imagine related configurations which employ other means to position the restraint rollers, and the carriers on which they are rotatably mounted, relative to the vehicle tires. These include manual means and automatic means employing a prime mover other than the vehicle tires.

In summary, the preferred embodiment of the invention is comprised of a vehicle restraint system for chassis dynamometers that relies entirely on the advancing tire to position the restraining rollers. The advancing tire makes initial contact with one of the guide rods, which in turn causes the restraining assembly, including guide rods, rollers, and carrier to move laterally so as to line up with the tire. After the tire is correctly located on the dynamometer rollers, the carrier is locked in place to prevent further motion. Another embodiment positions both restraint rollers on the inner sidewalls of the driving tires. Another positions both rollers on the outer sidewalls of the driving tires. Another positions the rollers on each side, with a spring means allowing their respective carriers to be pulled apart by the advancing tire. Disclosures regarding the fabrication of the invention The present invention is particularly suitable for garage and service station environments where robust, uncomplicated equipment is desirable. The frame for the restraint carrier is cut from U-shaped, 12 gauge metal framing channel (Unistrut, available from W. W. Grainger, Inc.) and is solidly bolted to the dynamometer frame or to the floor of the test area. The carrier itself is fabricated from stock steel with liberal tolerances. The wheels on which it moves are common rollers-with ball bearings. The attachment end of the guide rods is made from stock 1-inch diameter solid steel rod and can withstand the weight of a vehicle that may accidently drive over it. The free end of the guide rods is made from a lighter-weight, more flexible material that can be bent without breaking and without being permanently deformed. Fiberglass rod of the type used in fishing poles is recommended here This rod can be detached from the rest of the guide rod if it is damaged and needs, to be replaced. The locking mechanism may be a pin, activated by magnetic solenoid or pneumatic mechanism, that engages any of the holes drilled into the back of the carrier. For safety reasons, the locking device is wired so that when it is in its non-energized state, it locks the carrier. Thus, if there is a loss of electrical service or air pressure when a vehicle is driving on the dynamometer, the restraining effect will not be lost.

What is claimed is:

1. An automatically initially positionable restraint system for a chassis dynamometer to restrain driving tires of a vehicle on the dynamometer, said system comprising:

a restraint assembly including a carrier and a restraining arm mounted on the carrier for engagement with a side wall of a vehicle tire, and a support mounting said carrier for free movement laterally of the vehicle in response to initial contact of the restraining arm by a vehicle tire.

2. The system of claim 1, and further comprising a roller rotatably mounted on said restraining arm for engagement with the side wall of the vehicle tire.

3. The system of claim 1, and further comprising a locking mechanism to lock said carrier against lateral movement relative to the vehicle after automatic initial positioning.

4. The system of claim 1, wherein said restraint assembly includes two restraining arms mounted on said carrier for engagement respectively with opposite side walls of a vehicle tire.

5. The system of claim 4, and further comprising bias means resiliently urging said restraining arms toward each other.

6. The system of claim 1, wherein said restraint assembly includes two restraining arms mounted on said carrier for engagement respectively with side walls of two vehicle tires.

7. The system of claim 6, wherein said restraining arms are disposed for engagement respectively with outer side walls of the two vehicle tires.

8. The system of claim 6, wherein said restraining arms are disposed for engagement respectively with inner side walls of the two vehicle tires.

9. The system of any one claim 4-8, wherein each restraining arm includes a guide extension disposed for engagement with a vehicle tire as the tire approaches the dynamometer.

10. The system of any one of claims 4-8, and further comprising manually operable means for repositioning each restraining arm on the carrier.

11. The system of claim 1, wherein said restraint assembly includes two pairs of restraining arms mounted on said carrier, with the restraining arms of one pair being disposed for engagement respectively with opposite side walls of a first vehicle tire and with the restraining arms of the other pair being disposed for engagement respectively with opposite side walls of a second vehicle tire.

12. The system of claim 1, and further comprising a front roller rotatably mounted on said carrier and disposed for engagement with the tread of the vehicle tire.

13. The system of claim 1, and further comprising bias means resiliently urging said restraining arm toward engagement with the vehicle tire side wall.

* * * * *